Patented June 18, 1940

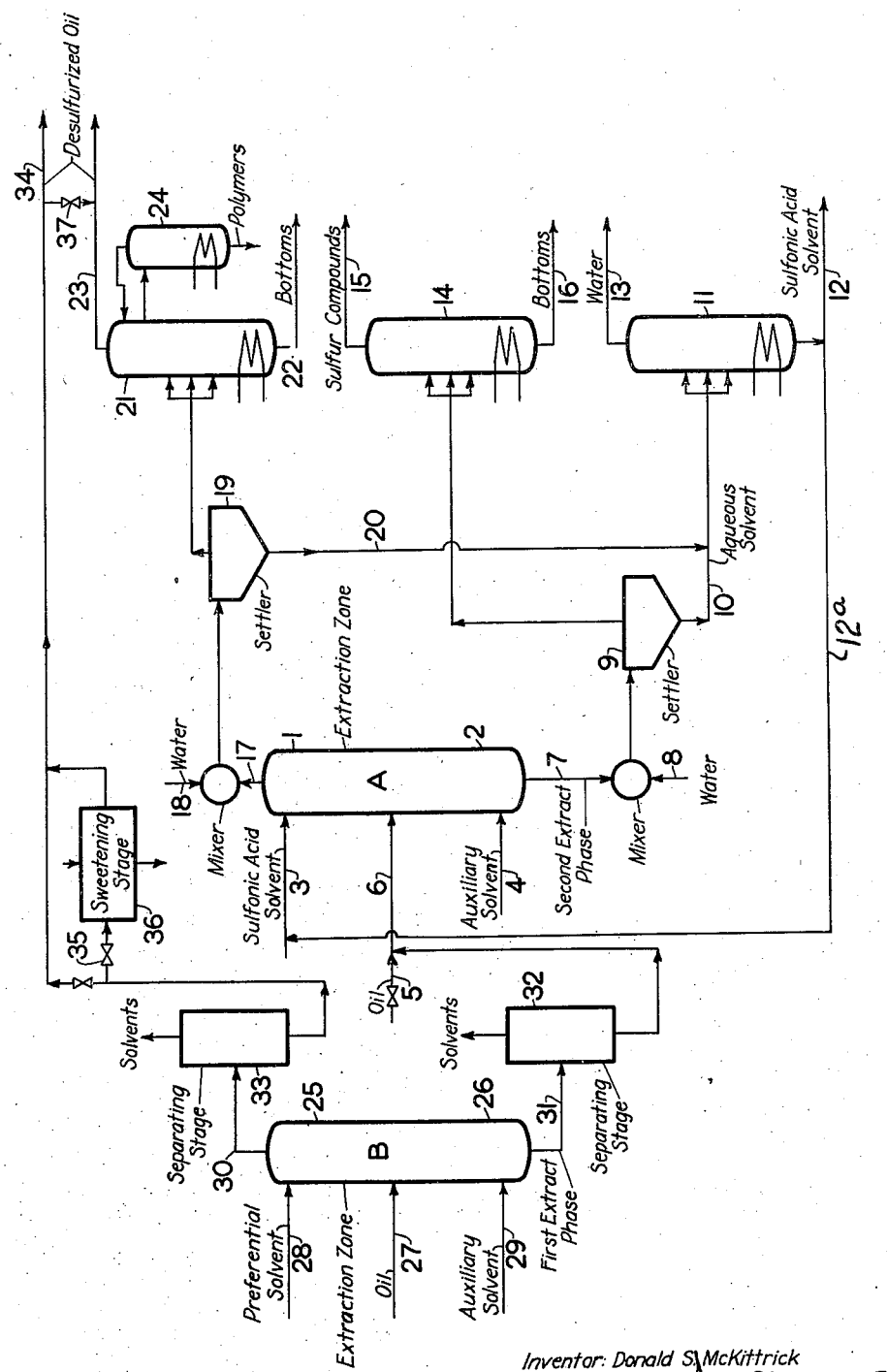

2,204,903

UNITED STATES PATENT OFFICE 2,204,903

PROCESS FOR DESULPHURIZING MINERAL OILS

Donald S. McKittrick, Oakland, Calif., assignor to Shell Development Company, San Francisco, Calif., a corporation of Delaware Application September 20, 1938, Serial No. 230,809

17 Claims. (Cl. 196—13)

This invention relates to the refining treatment of hydrocarbon oils, and has, among other objects, the purpose of reducing the sulphur content of low-boiling distillates, particularly naphthas, gasoline, and cracked or straight-run distillates, although other low boiling distillates such as kerosene, gas oil, and polymerized low-boiling oils may also be desulphurized in accordance with the present process.

This application is a continuation-in-part of my copending application Serial No. 159,234, filed August 16, 1937.

More specifically, the present process is concerned with the removal of the more refractory sulphur compounds, such as thiophene and its homologues, particularly alkyl thiophenes, from low-boiling distillates, but is also effective for removing other sulphur compounds, such as mercaptans and thioethers. The present invention is especially useful in the treatment of fractions containing appreciable quantities, i. e., more than about 10% of aromatic hydrocarbons, which it is desired to retain in the refined distillates, as, for example, in the treatment of gasoline in which aromatic hydrocarbons improve the anti-knock characteristics of the fuel, such fractions being difficult to desulphurize by the known methods without loss of aromatic hydrocarbons.

It is known to treat sulphur-bearing distillates with strong mineral acids, such as sulphuric acid, to remove the sulphur compounds which are partially dissolved in the acid, partially reacted therewith, and partially polymerized, and may be separated from the oil by separating the acid and resulting sludge and redistilling the treated oil. A draw-back of such a process has been that it is difficult to regenerate the sulphuric acid and to recover the hydrocarbons and sulphur compounds from the acid phase. Furthermore, because of the insufficient selectivity of sulphuric acid, it is not feasible to employ it as a solvent to extract sulphur compounds, particularly thiophenes and thioethers, from an oil containing appreciable quantities of aromatics, it being usually necessary to employ it under conditions causing an appreciable chemical reaction with or a polymerization of the sulphur compounds. This often leads to high losses, due to polymerization of unsaturates.

It has also been proposed to separate sulphur compounds from hydrocarbon oils by extracting the oil with a polar selective solvent which forms two liquid phases upon being mixed with the oil and preferentially dissolves the sulphur compounds (see U. S. Patent No. 2,024,117). A disadvantage of such a process has been that an appreciable quantity of hydrocarbons especially valuable because of their anti-knock properties is lost together with the sulphur compounds. This is due to the fact that most preferential solvents are not sufficiently selective between sulphur compounds and hydrocarbons, particularly aromatic hydrocarbons, to effect the desired separation. It is especially difficult to separate the higher boiling thioethers and thiophenes from distillates containing appreciable quantities of aromatic hydrocarbons of similar boiling points, because the distribution ratios of these sulphur compounds and of those aromatic hydrocarbons between the preferential solvent phase and the oil phase are similar for most of the selective solvents which come under consideration, certain aromatic hydrocarbons being, in fact, dissolved more readily than higher boiling thioethers.

It has now been found that these disadvantages are largely overcome and the efficiency of the desulphurization process is greatly improved by extracting the distillate in the liquid state with an aliphatic sulphonic acid which is liquid at 40° C. The lower acids containing less than four carbon atoms, i. e., methyl, ethyl, propyl and iso-propyl sulphonic acids are preferred. Higher acids and carbon substituted derivatives of such aliphatic sulphonic acids, such as butyl and amyl sulphonic acids, and halogenated aliphatic sulphonic acids may also be employed. The process is preferably carried out at a temperature below 40° C.; temperatures below 5° C. are particularly desirable.

The sulphonic acid extraction may be applied to any sulphur-bearing distillate. According to the preferred embodiment of the invention, however, it is applied to a cut in which sulphur compounds have been concentrated, as explained more particularly hereinafter.

It was found that while at elevated temperatures, i. e., above 40° C., sulphonic acids act partly in the manner of sulphuric acid, to polymerize unsaturates and sulphur compounds or otherwise to react with the sulphur compounds, the sulphonic acids here employed differ from sulphuric acid in that at lower temperatures they can be employed under such conditions that only a relatively smaller chemical reaction takes place, the sulphur compounds being for the greater part dissolved in the sulphonic acid, and being capable of being liberated from solution by washing with water or a similar substantially oil-immiscible substance. These sulphonic acids were found to act as solvents which are very highly selective, not only between hydrocarbons and thiophenes, but also between hydrocarbons and other types of sulphur compounds, notably higher boiling thioethers. A surprising property of these sulphonic acids is that the distribution constants of thioethers are substantially as great and in many cases exceed those of the thiophenes, so that both of these types of sulphur compounds may be separated together from the hydrocarbons in one extraction. These acids, therefore, may also be employed as selective solvents in liquid extractions wherein a sulphur-bearing distillate is contacted with one of these acids or with a mixture thereof under conditions causing the formation of liquid phases in equilibrium with one another. Sulphur compounds, as well as undesirable highly unsaturated gum-forming substances, the latter undergoing some chemical change, are dissolved in and are removed with the acid, the refined distillate being insoluble therein.

The treating agent, according to the present process, essentially comprises the sulphonic acids, either alone in the anhydrous state or diluted with a polar diluent, such as sulphur dioxide, acetic acid, methyl cyanide, a sulphone, such as dimethyl sulphone, or a substantially non-polar inert solvent in which the sulphonic acid is soluble, such as $SO_2$-soluble extract from pressure distillate residues, lubricating oils, etc., preferably boiling above the boiling temperature range of the distillate being desulphurized. The diluent is either substantially inert or, when not inert, like sulphuric acid, is present in minor proportions. It is preferred to operate in the absence of substantial amounts of sulphuric acid. Dilution of the sulphonic acid is often desirable to suppress the polymerizing action when treating distillates rich in olefines, such as cracked distillates. In certain cases it is desirable to operate the process at temperatures below the normal freezing point of the sulphonic acid or sulphonic acid mixture; this may be accomplished by employing the acid together with a diluent or other substance which forms a solution therewith having a lower freezing point than the pure acid. Water or a similar very highly polar oil-immiscible substance, if present, should preferably not exceed 5w% of the sulphonic acid, the anhydrous sulphonic being preferred; acid containing up to about 10w% or even more water may, however, be used.

The process, while applicable to all distillates, is particularly useful in connection with distillates which contain little or no olefinic hydrocarbons, such as straight-run distillates, or special cuts in which the sulphur compounds have been concentrated, such as highly sulphurous aromatic residues obtained by distilling cracked or uncracked distillates in the presence of a separating agent, which may be a polar preferential solvent for sulphur compounds, as described in my United States Patent No. 2,114,852. In the latter case, the distillate obtained in the distillation in the presence of the preferential solvent, optionally after a light sweetening treatment, may be blended with the refined product produced by desulphurizing the distillation residue in accordance with the present process. Instead of distilling with a separating agent, I may prepare the special cut by extracting the initial material with a preferential solvent for sulphur compounds, as described hereinafter and extract the resulting extract, containing a concentrate of the sulphur compounds and aromatics, with the sulphonic acid. This constitutes the preferred form of the invention.

In the practice of the present invention, the procedure includes the intimate mixing and agitation of the oil or distillate to be desulphurized with sufficient sulphonic acid to effect the desired desulphurization to cause the formation of two liquid phases, and the subsequent separation of the oil or raffinate phase from the acid or extract phase, by settling, centrifuging in one or in several successive stages, or the like. The sulphonic acid may be separated from the oil phase by washing in one stage or in several countercurrent stages with a washing agent like water or a similar highly polar substantially oil-immiscible organic substance, like methyl or ethyl alcohol, glycerol or glycol, their mixtures, or aqueous solutions thereof, about 15 to 75% by volume of the washing agent (based on the phase being washed) being usually sufficient, although smaller or larger amounts may be employed. The extraction phase then separates into an oil-rich phase and a sulphonic acid-rich phase. The former is then redistilled, dry or with steam, to separate polymerized substances, if these were formed. The sulphonic acid may be recovered from the acid or extract phase in a similar manner. The washings or sulphonic acid-rich phases may then be combined and treated by evaporation or distillation, if desired under vacuum, to regenerate the sulphonic acid in any desired degree of concentration, it being preferred to separate all of the washing agent to produce anhydrous or substantially anhydrous sulphonic acid. Alternatively, oil may be separated from the acid dissolved in the raffinate phase by distillation, preferably under vacuum to avoid the use of temperatures which would cause decomposition of the acid and/or reaction of the acid with the oil, it being understood that this mode of separation is applicable in the case of sulphonic acids which remain liquid during the distilation of the hydrocarbons. The oil may be redistilled in the presence of steam to produce a distillate containing substantially only substances boiling within the boiling temperature range of the initial fraction.

The quantity of sulphonic acid to be employed depends upon the sulphur content of the initial oil, upon the dilution of the acid, the temperature employed, and upon the degree of desulphurization desired. For example, one volume of a cracked distillate having an A. P. I. gravity of 45° and containing from about 0.5 to 1.0% sulphur may be mixed with about 0.05 to 10 volumes of a substantially anhydrous sulphonic acid at about −10 to 40° C., agitated for about 1 to 30 minutes or more, separated from the resulting sludge or acid solvent layer, washed with water, and redistilled, it being understood that these data are merely exemplary, and are not intended to restrict the scope of the invention. As is apparent from Example I, when conditions of contact time and composition of the oil favor chemical changes, small quantities of acid are employed, with the formation of a sludge; while in the case of a treatment such as in Example III, wherein little chemical changes are involved, greater quantities of acid are employed.

Of various forms of practicing my invention, I prefer to employ the sulphonic acid as a preferential solvent in a countercurrent extraction operation; this may involve a double countercurrent process employing a second or auxiliary solvent which is substantially non-polar, miscible with hydrocarbons and substantially immiscible with the sulphonic acid, although batch treatments, with or without an auxiliary solvent, may be used. This type of process is illustrated in the single figure of the accompanying drawing, which is a schematic flow diagram indicating the steps involved in the process, heat exchangers, valves, pumps, and other auxiliary apparatus being omitted.

Referring to the drawing, 1 and 2 represent rectifying and stripping sections, respectively, of a countercurrent extraction zone A, each section being arranged for the countercurrent flow of solvents through a number of stages, which may be virtual, as in a packed column, or real, as in a series of mixers and settlers. The concentrated sulphonic acid, which preferably contains not over 5% water and may be anhydrous, or its solution with another substance, such as one of the sulphonic acid-miscible diluents described above, or a mixture of several aliphatic sulphonic acids, is introduced at 3 to one end of the rectifying section 1. An auxiliary solvent which is essentially non-miscible with the solution of sulphur compounds in the sulphonic acid solvent under extracting conditions and is a solvent for the hydrocarbons and which preferably boils well outside of the boiling temperature range of the distillate to be desulphurized may be fed to one end of the stripping section 2 at 4. Any solvent which is non-polar or approximately non-polar may be employed for this purpose. The ratio of the sulphonic acid-containing solvent to the auxiliary solvent may be varied within wide limits, and may, for example, be one volume of sulphonic acid solvent to between about 0.25 and 6 volumes of auxiliary solvent. One of the important functions of the non-polar solvent is to dilute the oil being treated in order to reduce the polymerization loss. It has been found that the loss rate sharply diminishes when the concentration of polymerizable hydrocarbons in the oil-diluent solution resulting in the extraction zone, determined as olefines, is reduced below 30%. A highly paraffinic solvent, such as naphtha, iso-octane, and iso-pentane which boil below the boiling range, or highly refined white oil, which boils above the boiling range of the distillate to be desulphurized is preferred as the non-polar solvent, being only sparingly miscible with the sulphonic acid and inert with respect thereto, although any low or moderately low-boiling paraffinic or naphthenic hydrocarbon or mixtures thereof are also suitable. In the extraction zone raffinate and extract phases or layers (consisting predominantly of the auxiliary or non-polar solvent and of the sulphonic acid or polar solvent, respectively) are formed and flow countercurrently to one another, the raffinate phase from the stripping section 2 flowing into the rectifying section 1, and the extract phase from the rectifying section 1 flowing into the stripping section 2.

The sulphur-bearing oil distillate, is introduced at 5, and fed into the counterflowing solvents at 6, intermediate to the points of introduction of the solvents. It was found that the best results are obtained when the distillate is introduced at such a rate as to be present in the extraction zone in a concentration of less than about 15%. Economies in distillation are in this case effected by employing an auxiliary solvent boiling above the distillate being treated, such as white oil, it being then only necessary to distill the treated oil from the raffinate phase. The present invention is not, however, limited to operations at such low concentrations, but includes operations involving relatively high oil to solvent ratios such as 1 to 1.

The temperature is regulated in the extraction zone A to produce an ultimate extract phase, withdrawn at 7, largely free from hydrocarbons, containing the sulphonic acid solvent and dissolved sulphur compounds. It may be washed by agitating it with a substantially oil-immiscible solvent such as water or aqueous methyl or ethyl alcohol, etc., introduced at 8 and separating the resulting aqueous solvent phase from the phase containing the sulphur compounds in the settler 9, the former being withdrawn at 10 and introduced into the distilling column 11, wherein the sulphonic acid is completely or partially dehydrated by vacuum distillation. The regenerated sulphonic solvent is withdrawn at 12; it may be reintroduced into the process at 3 via line 12a. The water distilled off at 13 may be condensed, cooled and reintroduced at 8 and 18, thereby obviating the need of precise fractionating methods and avoiding loss of acid. The water-immiscible phase may be steam distilled in the column 14, sulphur compounds and steam being taken overhead at 15 and impurities and polymers being concentrated in the bottom product being withdrawn at 16. When an auxiliary solvent is employed, it may be separated from the sulphur compounds either prior to distillation in the column 14, or subsequently thereto; when a high boiling auxiliary solvent, such as white oil, is employed, it may be recovered in the bottom product at 16.

The raffinate phase containing most of the auxiliary solvent, if used, and consisting predominantly of auxiliary solvent and desulphurized hydrocarbons, but containing usually a small quantity of the sulphonic acid, is withdrawn at 17 and similarly washed by means of water or a similar substance introduced at 18 to form oil and solvent layers which are separated in the settler 19. The solvent phase withdrawn at 20, may be combined with the solvent phase from the settler 9. The water-immiscible oil layer, which is free from sulphonic acid, may be steam distilled in the column 21, wherein the auxiliary solvent is separated from the sulphurized oil. For example, when a high boiling auxiliary solvent, like white oil, is employed, it is withdrawn at 22 as a bottom product, the desulphurized oil being taken off at 23. Polymerized substances may be withdrawn in the bottoms, or, if desired, a side-stripper 24 may be employed to isolate these substances. The final desulphurized oil may, if desired, be further contacted with clay.

Instead of washing the extraction phases with water, they may be directly distilled to segregate the solvents and the solutes.

The oil introduced at 5 may be an untreated distillate or one which has received a light treatment, such as a caustic soda wash, or it may be a special cut such as a distillation residue containing a small proportion of the initial olefines, particularly the mono-olefines, and most of the sulphur compounds obtained by distilling a light distillate in the presence of a selective solvent, as described in the United States Patent No. 2,114,852. I prefer, however, to prepare the special cut by subjecting the initial distillate to a preliminary extraction treatment. For this purpose the initial distillate is introduced into an extraction zone B comprising a rectifying section 25 and a stripping section 26 at an intermediate point 27. This extraction zone may be similar to the extraction zone A. The preferential solvent for sulphur compounds is introduced near one end of the rectifying section at 28 and an auxiliary solvent for hydrocarbons, at least partially immiscible with the selective solvent, such as pentane, iso-octane, light naphtha, highly refined white oil and the like, is introduced at 29. In general, solvents which are suitable for extracting aromatic hydrocarbons from paraffin hydrocarbons may be employed as preferential solvents at 28. The following solvents were found to be especially suitable for this purpose: a mixture of equal parts of sulphur dioxide and acetone, thiophene, aldehyde, methyl cyanide, ethyl cyanide, ethyl cyanoacetate, nitroaniline, aniline, ethylene diamine, liquid sulphur dioxide, methoxy methyl cyanide, methyl carbitol, and their mixtures. Solvents which are too miscible with the distillates may be diluted with water or a similar highly polar oxygenated aliphatic compound, light methyl alcohol, ethyl alcohol, acetone, or their aqueous solutions.

The rates of flow of materials and the temperature are regulated to produce counterflowing raffinate and extract phases which are withdrawn at 30 and 31, respectively, the latter containing substantially all of the sulphur compounds and preferably as small a proportion of the mono-olefines as is consistent with the requirement that the suphur compounds be substantially all recovered in the extract phase. Under these conditions most of the aromatics and highly unsaturated substances like di-olefines will be concentrated in the extract phase, together with the sulphur compounds, and substantially all of the paraffines and naphthenes will be in the raffinate phase, together with the mono-olefines. The concentration of the olefines in the extract phase may be lower than, the same as, or even higher than in the initial distillate, the only requirement being that the ratio of mono-olefines to sulphur compounds be materially less in the extract phase than in the initial distillate. The extract phase may, for example, contain between about 15 and 40w% (percent by weight) of the initial distillate, depending upon its composition although the process is not limited to such a range. As a specific example, a cracked gasoline friction boiling between 150 and 200° C., containing 13w% aromatics and 1.2w% sulphur, and approximately equal proportions of saturated and unsaturated aliphatic hydrocarbons, may be extracted to produce an extract amounting to 20w% of the initial distillate, the extract containing about 55w% aromatics, 5w% sulphur (corresponding approximately to 19w% sulphur compounds), about 15 to 20w% mono-olefines, the balance being diolefines, naphthenes and paraffines. Such an extract would contain only about 10 to 15w% of the total mono-olefines.

The extract phase may be treated in the separating stage 32 to separate the solvents in any suitable manner as by distillation or washing. The solvent free portion of the extract phase, which constitutes the special cut according to the preferred embodiment is introduced into the extraction zone A at 6.

The raffinate phase from 31 is similarly freed from solvents in the separating stage 33, the desulphurized portion of the distillate being withdrawn after 34. This oil may, if desired, be flowed through a valve 35 and given a light sweetening treatment in the unit 36 by any suitable method such as sodium plumbite or a caustic soda treatment. The desulphurized oil from the raffinate withdrawn at 31 may be blended with the desulphurized oil from the extraction zone A by means of a valve 37.

Example I

Separate samples of a cracker gasoline of 45° A. P. I. gravity containing 0.74w% (percent by weight) of sulphur were mixed with 10% and 15% by volume, respectively, of methyl sulphonic acid, agitated at 0° C. for 2 minutes and 5 minutes, respectively, settled for 5 minutes, and the oil layer decanted from the acid extract layer, which contained sludge. The oil was repeatedly washed with water and steam distilled. For comparison, another portion of the gasoline was agitated at 0° C. with 5% by volume of 66° Bé. sulphuric acid, agitated for 5 minutes and settled for 5 minutes, and similarly decanted, washed, and redistilled. Another sample was similarly steam distilled without treatment with acid. The results are tabulated in the following table:

| Treating agent | Methyl sulphonic acid | Methyl sulphonic acid | Sulphuric acid 66° Bé. | None |
| --- | --- | --- | --- | --- |
| Volume of treating agent, percentage of oil volume percent | 10 | 15 | 2 | 0 |
| Time of mixing....minutes | 2 | 5 | 5 | |
| Time of settling......do | 5 | 5 | 5 | |
| Properties of treated oil before steam distillation: | | | | |
| Yield by volume percent | 98 | 96.6 | 97.7 | 100 |
| Sulphur content percent by weight | .59 | .55 | .64 | .74 |
| Percentage sulphur reduction......percent | 19.6 | 18.5 | 12.4 | 0 |
| Properties of treated oil after steam distillation: | | | | |
| Yield by volume percent | 97.6 | 96.2 | 97.1 | 99.3 |
| Sulphur content percent by weight | .55 | .51 | .63 | .71 |
| Percentage sulphur reduction......percent | 25.4 | 30.9 | 13.7 | 3.0 |

It will be noted that yield in the sulphuric acid run was intermediate to the two treatments with methyl sulphonic acid, and that the percentage reduction of sulphur was considerably greater in the treatments involving methyl sulphonic acid.

Example II

The gasoline fraction described in Example I boiling above 150° C. was extracted at 20° C. in a continuous double countercurrent extraction apparatus comprising mixing and settling stages, consisting of 3 stages in the rectifying section and 3 stages in the stripping section, connected as shown on the drawing. The apparatus was operated continuously, employing aqueous 97½% methyl sulphonic acid as the polar solvent and iso-octane as the non-polar solvent. The rates of introduction in volumes per minute were as follows: gasoline, 7; polar solvent, 1¾; non-polar solvent, 1¾. The raffinate was washed with water and steam distilled to produce a desulphurized distillate having a sulphur content of .10w%, amounting to 85% by volume of the initial oil, corresponding to a reduction in sulphur of 86.5%.

Example III 100 parts by weight of a (cracked) pressure distillate cut boiling between 150 and 200° C. containing 1.1w% sulphur was extracted in double counter-current with liquid SO₂ and iso-octane in the apparatus described in Example II, producing 80 parts of an SO₂ raffinate containing 0.2w% sulphur, and 20 parts of a SO₂ extract, containing 4.4w% sulphur. The SO₂ extract was subjected to two batch extractions, each time with four parts by volume (based on the material being extracted) of isopentane and ten parts by volume of anhydrous methyl sulphonic acid, containing about 10w% ethyl sulphonic acid, at 0° C. The acid was separated from the three phases by washing out with water, followed by steam distillation, resulting in the following distillates: 2.2 parts of a first acid extract containing 14.2w% sulphur (equivalent to about 53w% sulphur compounds); 1.1 parts of a second acid extract containing 6.9w% sulphur; and 12.2 parts of a raffinate containing 1.2w% sulphur. About 4.5 parts were separated as polymers and reaction products in the distillation. A blend of the two raffinates represents 92.2% of the initial distillate and contains about 0.3w% sulphur.

*Example IV*

To demonstrate the selectivity of these sulphonic acids, one volume of a synthetic composition consisting of trimethyl thiophene, trimethyl benzene, and triisobutylene was mixed with one and one half volumes of the acid solvent employed in Example III, at 0° C., agitated for one minute, the resulting mixture was allowed to settle for 40 minutes, and the resulting layers were separated. One volume of the oil layer was again contacted under the same conditions with one and one half volumes of the fresh solvent, forming second phases. The acid was separated from the several phases as in Example III. The yields and compositions of the products were as follows:

| Compositions, parts by volume | Original mixture | Solute in first extract layer | Solute in second extract layer | Solvent-free portion of second raffinate layer |
|---|---|---|---|---|
| Trimethyl thiophene | 25 | 12 | 7 | 5 |
| Trimethyl benzene | 57 | 5 | 3 | 47 |
| Tri-isobutylene | 18 | 0 | 0 | 16 |
|  | 100 | 17 | 10 | 71 |
| Ratio of trimethyl benzene to trimethyl thiophene | 2.3 | 0.42 | 0.43 | 9.4 |

The foregoing data indicate that the sulphonic acid is highly selective between sulphur compounds and aromatics. In this work losses due to polymerization or reaction amounted to less than about 2% by volume of the initial material.

I claim as my invention:

1. The process for desulphurizing sulphur-containing low-boiling mineral oil comprising the steps of contacting said oil in the liquid state at a temperature not substantially above 40° C., with a refining agent essentially comprising an aliphatic sulphonic acid containing not over five carbon atoms and which is liquid at 40° C., under conditions causing the formation of a sulphonic acid phase containing absorbed sulphur compounds and a liquid oil phase, and separating the sulphonic acid phase from the liquid oil phase.

2. The process according to claim 1 in which the separated oil phase is freed from the sulphonic acid and then distilled to produce a distillate containing substantially only substances boiling within the boiling temperature range of the original oil.

3. The process according to claim 1 which comprises the further steps of washing one of the said phases with a substantially oil-immiscible washing agent of the class consisting of water, methyl alcohol, ethyl alcohol, glycol and glycerol to produce a liquid phase containing constituents of the oil and a dilute sulphonic acid liquor phase, separating said phases, concentrating the sulphonic acid by vaporization of the washing agent from the sulphonic acid liquor phase and recycling the concentrated sulphonic acid to the step of contacting further oil to be desulphurized.

4. The process according to claim 1 in which the sulphonic acid contains less than four carbon atoms.

5. The process according to claim 1 in which the sulphonic acid is predominantly methyl sulphonic acid.

6. The process according to claim 1 in which the sulphonic acid is predominantly ethyl sulphonic acid.

7. The process according to claim 1 in which the mineral oil is contacted with the sulphonic acid together with a quantity of an oil-miscible diluent sufficient to cause the concentration of olefines in the oil-diluent solution to be less than 30%.

8. The process according to claim 1 in which the sulphonic acid is employed together with a diluent which is miscible with the sulphonic acid and substantially immiscible with the oil.

9. The process for desulphurizing a sulphur-containing mineral oil boiling substantially within gasoline range and containing more than about 10% of aromatic hydrocarbons, comprising the steps of contacting said oil in the liquid state at a temperature not substantially above 40° C. with a quantity of a solvent essentially comprising an aliphatic sulphonic acid containing not over five carbon atoms and which is liquid at 40° C., said quantity being sufficient for the formation of a liquid sulphonic acid phase containing absorbed sulphur compounds and a liquid oil phase, and separating the resulting liquid sulphonic acid phase from the liquid oil phase.

10. The process for desulphurizing sulphur-containing low-boiling mineral oil comprising the steps of counterflowing a solvent essentially comprising an aliphatic sulphonic acid containing not over five carbon atoms and which is liquid at 40° C., and a solvent which is miscible with the oil and substantially immiscible with the sulphonic acid solvent in an extraction zone, at a temperature not substantially above 40° C., under conditions to form counterflowing extract and raffinate phases, introducing the oil into the extraction zone at a point intermediate the points of introduction of the sulphonic acid and the oil-miscible solvent, whereby sulphur compounds are absorbed in the extract phase and withdrawing extract and raffinate phases at different points from the extraction zone.

11. The process for desulphurizing sulphur-containing low-boiling mineral oil comprising the steps of counterflowing a solvent essentially comprising an aliphatic sulphonic acid which is liquid at 40° C., containing less than four carbon atoms and a solvent which is miscible with the oil and substantially immiscible with the sulphonic acid in an extraction zone, at a temperature not substantially above 40° C., under conditions to form counterflowing extract and raffinate phases, introducing the oil into the extraction zone at a point intermediate the points of introduction of the sulphonic acid and the oil-miscible solvent, whereby sulphur compounds are absorbed in the extract phase withdrawing extract and raffinate phases at different points from the extraction zone, contacting the raffinate phase with a substantially oil-immiscible washing agent of the class consisting of water, methyl alcohol, ethyl alcohol, glycol and glycerol thereby forming a liquid oil phase and a diluted acid liquor phase, and separating said phases one from the other.

12. The process for desulphurizing sulphur-containing low-boiling mineral oil comprising the steps of counterflowing a solvent essentially comprising an aliphatic sulphonic acid which is liquid at 40° C. containing less than four carbon atoms and a said oil in an extraction zone, at a temperature not substantially above 40° C., under conditions to form counterflowing extract and raffinate phases, said extract phase containing absorbed sulphur compounds, withdrawing extract and raffinate phases at different points from the extraction zone, contacting the raffinate phase with a substantially oil-immiscible washing agent of the class consisting of water, methyl alcohol, ethyl alcohol, glycol and glycerol, thereby forming a liquid oil phase and a diluted acid liquor phase, separating said phases one from the other, and distilling the separated oil phase to recover the desulphurized chemically unchanged low-boiling mineral oil as a distillate and the polymerized constituents as a distillation residue.

13. The process for desulphurizing sulphur-containing low-boiling mineral oil comprising the steps of extracting said oil with a selective solvent for sulphur compounds to produce an oil raffinate and an extract in which the sulphur compounds are concentrated, separating said raffinate and extract, contacting said extract in the liquid state at a temperature not substantially above 40 C. with a refining agent essentially comprising an aliphatic sulphonic acid containing not over five carbon atoms and which is liquid at 40° C., under conditions causing the formation of a sulphonic acid phase containing absorbed sulphur compounds and a liquid oil phase, and separating the sulphonic acid phase from the liquid oil phase.

14. The process for desulphurizing low-boiling mineral oil containing sulphur compounds and mono-olefines comprising the steps of separating said oil into a first cut having a higher ratio of sulphur compounds to mono-olefines and a second cut having a lower ratio of sulphur compounds to mono-olefines than the original oil, contacting the first cut in the liquid state at a temperature not substantially above 40° C. with a quantity of a solvent essentially comprising an aliphatic sulphonic acid containing not over five carbon atoms and which is liquid at 40° C., said quantity being sufficient to cause the formation of a liquid oil phase and a liquid solvent phase containing absorbed sulphur compounds, and separating the resulting liquid sulphonic acid phase from the liquid-oil phase.

15. The process according to claim 14 in which the oil is separated into said first and second cuts by distilling the initial oil in the presence of a preferential solvent for sulphur compounds under conditions to distil said second cut overhead and recover said first cut as a distillation residue.

16. The process according to claim 14 in which the oil is separated into said first and second cuts by extracting the initial oil with a selective solvent for sulphur compounds to produce an oil raffinate containing said second cut and an extract containing said first cut.

17. The process according to claim 14 in which the second cut is blended with the oil in the liquid oil phase.

DONALD S. McKITTRICK.